United States Patent [19]

Lambrecht

[11] 4,369,389
[45] Jan. 18, 1983

[54] DEVICE FOR SECURING WINDING BARS IN SLOTS OF ELECTRIC MACHINES, ESPECIALLY TURBO-GENERATORS

[76] Inventor: Dietrich Lambrecht, Rathenaustr. 11, 4330 Mülheim, Ruhr, Fed. Rep. of Germany

[21] Appl. No.: 258,378

[22] Filed: Apr. 28, 1981

[30] Foreign Application Priority Data

May 2, 1980 [DE] Fed. Rep. of Germany ....... 3016990

[51] Int. Cl.³ .............................................. H02K 3/48
[52] U.S. Cl. .................................... 310/214; 310/215
[58] Field of Search ............. 310/214, 215, 194, 60 A, 310/64, , 213, 43; 336/197

[56] References Cited

U.S. PATENT DOCUMENTS

| 2,664,214 | 12/1953 | Huntley | 310/64 |
| 2,922,058 | 1/1960 | Bacon | 310/214 |
| 3,158,770 | 11/1964 | Coggeshall et al. | 310/214 |
| 3,780,325 | 12/1973 | Frankenhauser | 310/214 |
| 3,909,931 | 10/1975 | Lambrecth | 310/214 |
| 3,949,255 | 4/1976 | Brown et al. | 310/214 |

FOREIGN PATENT DOCUMENTS 1208805 1/1966 Fed. Rep. of Germany ...... 310/214

Primary Examiner—R. Skudy
Attorney, Agent, or Firm—Herbert L. Lerner

[57] ABSTRACT

Device for securing winding bars in slots of electric machines, including at least one winding bar having sides and being disposed in each slot, a slot-closing wedge disposed in vicinity of the opening of the slot, at least one wavy slot-closing spring having a given first spring travel distance, and being disposed in the slot in longitudinal direction thereof, the slot-closing spring being formed of glass fabric embedded in a hardenable resin and being compressed by approximately 80% of the given first spring travel distance, and a wavy lateral slot spring having a given second spring travel distance and being disposed between a side of the at least one winding bar and an adjacent side wall of the slot in longitudinal direction of the slot, the lateral slot spring being formed of glass fabric embedded in a hardenable resin and being compressed by at least 85% of the given second spring travel distance.

6 Claims, 6 Drawing Figures

DEVICE FOR SECURING WINDING BARS IN SLOTS OF ELECTRIC MACHINES, ESPECIALLY TURBO-GENERATORS

The invention relates to a device for securing winding bars in slots of electric machines, especially turbo-generators, with at least one winding bar per slot, a slot-closing wedge disposed in the vicinity of the slot opening, as well as at least one wavy slot-closing spring extending in the longitudinal direction of the slot, the slot-closing spring being formed of glass fabric embedded in a hardenable resin and being compressed by about 80% of its spring travel when installed in the slot.

Such a device is already known from German Published, Prosecuted Application DE-AS 21 65 727. Due to the fact that the slot-closing spring is compressed by about 80% of its spring travel during installation, almost the entire spring travel is available in the known device to compensate setting phenomena of the slot filling. Thus, a permanently sufficient pretensioning force of the slot closing spring is obtained, through which radial play of the winding bars in the slot, and in particular, lifting off the slot bottom, is prevented even after an extended period of time. On the other hand, the strong pretension of the slot-closing spring leads to a large stress, since vibration stress caused by bar forces pulsating at twice the operating frequency is additionally superimposed on the stress generated by the pretensioning. The vibration amplitude tolerable with the slot-closing spring in the long term decreases with increasing pretension. This dependence of the fatigue behavior of the slot-closing spring on the pretension and the vibration amplitude becomes increasingly important with increasing unit ratings of dynamo-electric machines and bar currents increasing accordingly since the bar forces increase in proportion to the square of the bar currents. In addition, larger bar forces require either the use of thicker slot-closing springs or the employment of two or more slot-closing springs arranged on top of each other. Both measures also have a negative effect on the life of the slot-closing springs, because in thicker slot-closing springs the shear forces are increased and wear phenomena occur if slot-closing springs are arranged on top of each other.

It is accordingly an object of the invention to provide a device for securing winding bars in slots of electric machines, especially turbo-generators, which overcomes the hereinafore-mentioned disadvantages of the heretofore-known devices of this general type, and to improve the known device in such a way that long life of the slot-closing springs is ensured even with very large bar forces.

With the foregoing and other objects in view there is provided, in accordance with the invention, a device for securing winding bars in slots of electric machines, especially turbo-generators, comprising at least one winding bar having sides and being disposed in each slot, a slot-closing wedge disposed in vicinity of the opening of the slot, at least one wavy slot-closing spring having a given first spring travel distance and being extended in the slot in longitudinal direction thereof, the slot-closing spring being formed of glass fabric embedded in a hardenable resin and being compressed by approximately 80% of the given first spring travel distance, and a wavy lateral slot spring having a given second spring travel distance and being disposed between a side of the at least one winding bar and an adjacent side wall of the slot extended in longitudinal direction of the slot, the lateral slot spring being formed of glass fabric embedded in a hardenable resin and being compressed by at least 85% of the given second spring travel distance.

From French Pat. No. 13 07 821 it is already known to use wavy lateral slot springs of insulating material as the sole means for securing winding bars. However, reference to the combined use of slot-closing springs and lateral slot springs cannot be gathered from this publication.

In the device according to the invention, in contrast thereto, a functional cooperation between the slot closing spring and the lateral slot spring is obtained if the construction rules given for the installation are observed, whereby the fatigue strength of the slot-closing spring is substantially increased. This is explained by the fact that through the pretensioning force of the lateral slot spring, a friction force is brought about at the side wall of the slot, which partially compensates the pulsating bar forces acting in the radial direction and reduces the vibration amplitude which the slot-closing spring must withstand. The problem of sufficiently long life, however, is by no means transferred thereby from the slot-closing springs to the lateral slot spring, although the lateral slot spring is compressed in installation by at least 85% of its spring travel for compensating setting phenomena. This is because only a relatively small vibration stress is superimposed since the pulsating bar forces in the tangential direction amount to only about 5 to 10% of the pulsating bar forces in the radial direction.

In one preferred embodiment of the device according to the invention, an electrically conducting pigment is admixed to the hardenable resin.

In accordance with another feature of the invention, there is provided an electrically conducting pigment admixed to the hardenable resin of the lateral slot spring; this gives the lateral slot spring semiconducting properties so that possible corona discharges between the winding bars and the side wall of the slot are prevented from the start.

In accordance with a further feature of the invention, the lateral slot spring has corrugations or waves aligned at an angle to the longitudinal direction of the slot.

In accordance with an added feature of the invention, the angle of alignment of the corrugations or waves to the longitudinal direction of the slot is approximately 45°. This results in a diagonal direction of the corrugation or wave with a more uniform distribution of the spring forces directed toward the winding bars and the side wall of the slot.

In accordance with a concomitant feature of the invention, the lateral slot spring is subdivided in the longitudinal direction of the slot. Such sectional insertion of the lateral slot spring substantially facilitates the installation.

Other features which are considered as characteristic for the invention are set forth in the appended claims.

Although the invention is illustrated and described herein as embodied in a device for securing winding bars in slots of electric machines, especially turbo-generators, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings in which.

Figure 1:
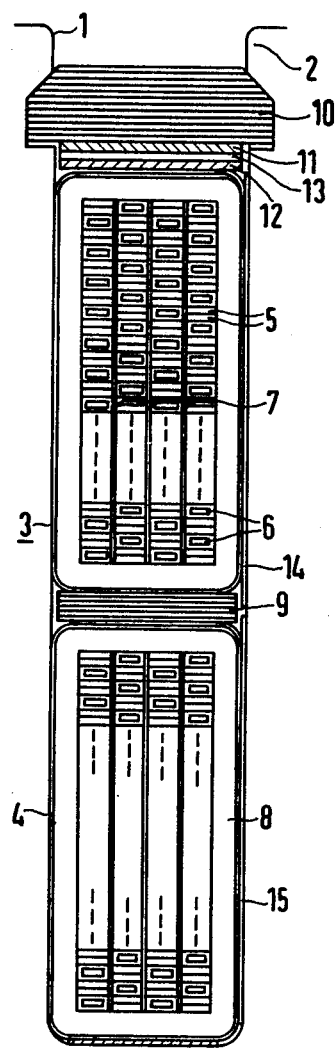
FIG. 1 is a diagrammatic cross-sectional view of a slot, into which a slot-closing spring and a lateral slot spring are inserted according to the invention.
Figure 2:
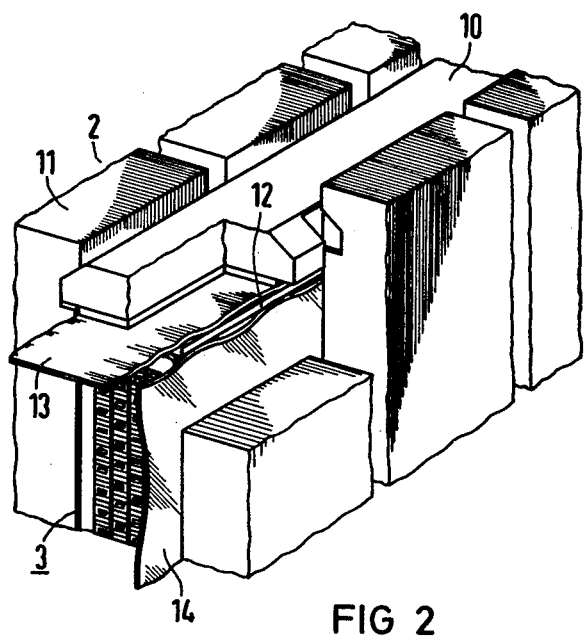
FIG. 2 is a fragmentary longitudinal and cross-sectional perspective view of a slot.
Figure 3:
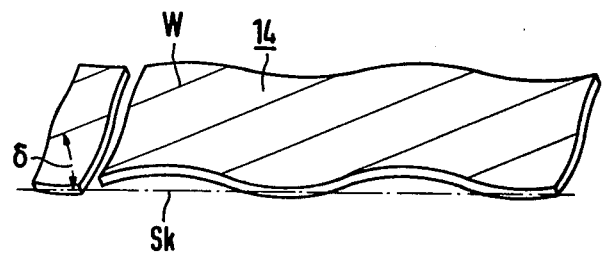
FIG. 3 is a fragmentary perspective view of the diagonal arrangement of the corrugations of the lateral slot spring.

Referring now to the figures of the drawing and first particularly to FIGS. 1–3 thereof, it is seen that according to the embodiment example shown therein, two winding bars 3 and 4 are arranged on top of each other in the slot 1 of a stator lamination stack 2. These two winding bars 3 and 4 are of identical construction and include solid staggered conductors 5 and corresponding hollow conductors 6 for cooling the winding. The individual conductor planes are separated from each other by layer insulation 7 and are enclosed as a whole by an insulation 8. A slot separator 9 is provided between the two bars 3 and 4 while the slot 1 is closed at the upper end thereof by a slot-closing wedge 10, which is inserted with a dovetail joint into recesses of the slot flanks.

Figure 4:
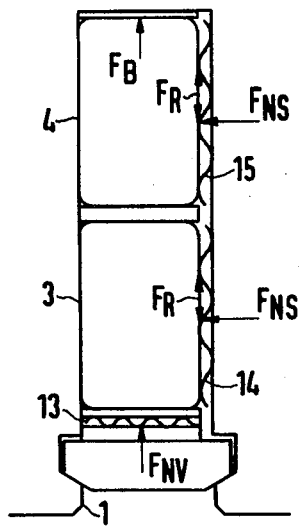
FIG. 4 is a simplified and rotated view similar to FIG. 1, showing the functional interrelation between the bar forces and the forces caused by the slot-closing springs and the lateral slot spring.

For radial tightening of the winding bars 3 and 4, a slot-closing spring 13 is disposed under the slot-closing wedge 10, between a slip strip 11 and a cover slider 12. The slot-closing spring 13 has the shape of a leaf spring that is corrugated in the longitudinal direction. For tangential tightening of the two winding bars 3 and 4, lateral slot springs 14 and 15 are disposed between the flanks of the bars and the side wall of the slot, the lateral slot spring 14 being associated with the winding bar 3 and the lateral slot spring 15, with the winding bar 4. The two lateral slot springs 14 and 15 likewise have the shape of a corrugated leaf spring, in which the waves, however, are not aligned parallel or perpendicular, but diagonally at an angle of 45' to the longitudinal direction of the slot 1, in order to obtain more uniform transmission of force. As can be seem particularly well from the view of the lateral slot spring 14 according to FIG. 3, this diagonal wave or corrugation alignment is obtained by aligning the cutting edge Sk at an angle of $\delta = 45°$ to the direction of the waves W when it is cut from a larger sheet. In other words, the lateral slot springs are cut on a bias. FIG. 4 shows the forces acting in the region of the slot filling in a highly simplified diagrammatic view. In FIG. 4 it is seen that the pulsating bar force, which is caused by the current forces and acts in the direction toward the bottom of the slot 1, is designated with reference character $F_B$; the pretensioning force of the slot closing spring 13 acting in the radial direction is designated with reference character $F_{NV}$; and the pretensioning force of the lateral slot springs 14 and 15, respectively, acting in the tangential direction is designated with reference character $F_{NS}$. Besides a tangential tightening due to the friction at the sides of the slot, the tangentially directed pretensioning force $F_{NS}$ causes a radially directed friction force $F_R$, which is always opposed to the pulsating bar force $F_B$. Conversely, the radial pretensioning force $F_{NV}$ produces a tangentially directed friction force at the bars which damps the pulsating excitations in the tangential direction and thereby protects the lateral slot springs against vibration stresses.

Figure 5:
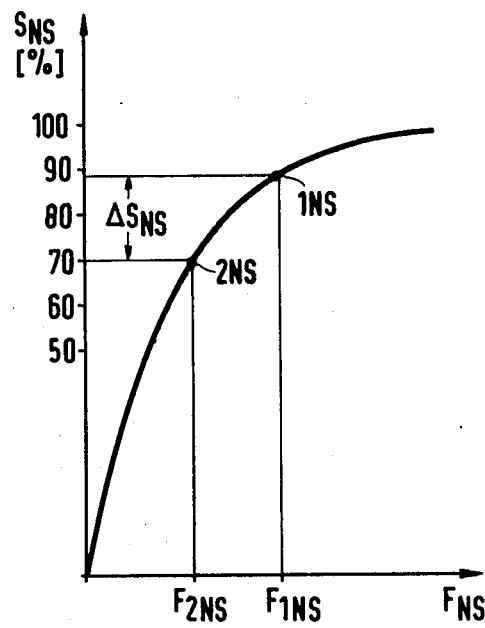
FIG. 5 is a graph of the spring characteristic of the lateral slot spring.

In the diagram according to FIG. 5, the spring characteristic of a lateral slot spring is shown. This characteristic shows the interrelationship between the spring force $F_{NS}$ and the relative spring excursion $s_{NS}$, where the maximally possible spring travel $s_{NS}$ is designated at the 100% point. At measurements up to about 70% of the relative spring travel, the characteristic shown is approximately linear and then assumes a shape which is degressively flattened with respect to the spring force $F_{NS}$. Such a spring characteristic is obtained by an unidirectional glass fabric which is impregnated with resin and hardened, and in which the fiber strands disposed transversely to the waves are about 15 times heavier than the fiber strands disposed parallel to the waves. In the installation, the lateral slot spring is compressed to at least 85% of its relative spring travel $s_{NS}$ and generates in the process a pretensioning force $F_{1NS}$ (point 1NS of the characteristic). If in the course of the operation, for instance in the course of many years, an amount of tangential setting $\Delta s_{NS}$ occurs in the slot filling, the lateral slot spring expands by this amount, and in the process generates a pretensioning force $F_{2NS}$ (point 2NS of the characteristic). This pretensioning force $F_{2NS}$ is still large enough so that on one hand secure fixation of the slot filling is ensured, and on the other hand, a radial friction force $F_R$ (shown in FIG. 4) is obtained which is sufficient to prolong the life of the slot-closing spring.

Figure 6:
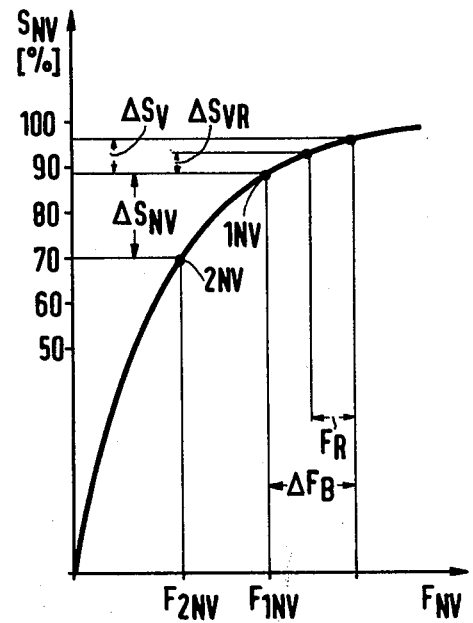
FIG. 6 is a graph of the spring characteristic of the slot-closing spring.

In the diagram according to FIG. 6, the spring characteristic of a slot-closing spring is shown. This characteristic shows the interrelationship between the spring force $F_{NV}$ and the relative spring travel $s_{NV}$, where the maximally possible spring travel $s_{NV}$ is designated with a 100% point. The characteristic shown is approximately linear up to about 70% of the relative spring travel $s_{NS}$ and then assumes a shape which is degressively flattened with respect to the spring force $F_{NV}$. Such a spring characteristic is obtained by an undirectional glass fabric which is impregnated with resin and hardened, and in which the fiber strands running transversely to the waves are approximately 15 times heavier than the fiber strands running parallel to the waves. In the installation, the slot-closing spring is compressed to at least 80% of a relative spring travel $s_{NV}$ and in the process generates a pretensioning force $F_{1NV}$ (point 1NV of the characteristic). If in the course of the operation, for instance in the course of many years, an amount $\Delta s_{NV}$ of radial setting occurs in the slot filling, then the lateral slot spring expands by this amount and in the process generates a pretensioning spring force $F_{2NV}$ (point 2NV of the characterisic). This pretensioning spring force $F_{2NV}$ is still large enough so that lifting of the winding bar from the bottom of the slot and coincident pounding is therefore prevented. This, however, assumes that at that point in time the slot-closing spring still has the characteristic shown and is not degraded by fatigue phenomina. Such fatigue phenomena could be caused by vibration stresses which are superimposed on the pretensioning force $F_{NV}$ and are generated by the pulsating bar forces $F_B$. Without additionally installed lateral slot springs, the pulsating bar force $\Delta F_B$ superimposed on the pretensioning spring force $F_{1NV}$ would then cause a vibration amplitude $\Delta s_V$, while with the additionally installed lateral slot spring, the already described friction force $F_R$ counteracts the pulsating bar force $\Delta F_B$, and a substantially smaller vibration amplitude $\Delta s_{VR}$ is brought about. Through the additional installation of the lateral slot spring, the long-term behavior of the slot-closing spring is thus improved substantially.

There is claimed:

1. Device for securing winding bars in slots of electric machines, comprising at least one winding bar having sides and being disposed in each slot, a slot-closing wedge disposed in vicinity of the opening of the slot, at least one wavy slot-closing spring having a given first spring travel distance and being disposed in the slot in longitudinal direction thereof, said slot-closing spring being formed of glass fabric embedded in a hardenable resin and being compressed by approximately 80% of said given first spring travel distance, and a wavy lateral slot spring having a given second spring travel distance and being disposed between a side of said at least one winding bar and an adjacent side wall of the slot in longitudinal direction of the slot, said lateral slot spring being formed of glass fabric embedded in a hardenable resin and being compressed by at least 85% of said given second spring travel distance.

2. Device according to claim 1, including an electrically conducting pigment admixed to said hardenable resin of said lateral slot spring.

3. Device according to claim 1 or 2, wherein said lateral slot spring has corrugations aligned at an angle to the longitudinal direction of the slot.

4. Device according to claim 3, wherein said angle of alignment of said corrugations to the longitudinal direction of the slot is approximately 45°.

5. Device according to claim 1 or 2, wherein said lateral slot spring is subdivided in the longitudinal direction of the slot.

6. Device according to claim 3, wherein said lateral slot spring is subdivided in the longitudinal direction of the slot.

* * * * *